(12) United States Patent
Forslund et al.

(10) Patent No.: US 6,455,799 B1
(45) Date of Patent: Sep. 24, 2002

(54) ROBOT DEVICE

(75) Inventors: Karl-Erik Forslund, Västeråas (SE); Leif Tellden, Västeråas (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/868,319

(22) PCT Filed: Dec. 8, 1997

(86) PCT No.: PCT/SE99/02297

§ 371 (c)(1),
(2), (4) Date: Sep. 6, 2001

(87) PCT Pub. No.: WO00/37224

PCT Pub. Date: Jun. 29, 2000

(30) Foreign Application Priority Data

Dec. 18, 1998 (SE) ................................................ 9804413

(51) Int. Cl.⁷ ............................ B23K 9/28; B23K 11/11; B25J 18/04
(52) U.S. Cl. .................. 219/86.25; 219/91.2; 74/490.02
(58) Field of Search ............................... 901/27, 28, 29; 219/124.1, 125.1, 86.1, 86.25, 91.2; 700/245–264; 318/568.11, 568.12; 623/65; 414/1–8, 729; 74/490.01, 490.02

(56) References Cited

U.S. PATENT DOCUMENTS

| | | | | |
|---|---|---|---|---|
| 4,246,661 A | * | 1/1981 | Pinson | |
| 4,546,233 A | * | 10/1985 | Yasuoka | |
| 4,898,317 A | * | 2/1990 | Ito et al. | |
| 4,906,121 A | * | 3/1990 | Torii et al. | |
| 4,933,531 A | * | 6/1990 | Ichikawa et al. | |
| 5,669,269 A | * | 9/1997 | Katamine et al. | |
| 5,816,108 A | * | 10/1998 | Obata et al. | |
| 6,014,909 A | * | 1/2000 | Fiora | |
| 6,153,828 A | * | 11/2000 | Murata et al. | |

FOREIGN PATENT DOCUMENTS

| | | |
|---|---|---|
| EP | 0 248 911 | 12/1987 |
| EP | 0 276 313 | 8/1988 |
| EP | 0 873 826 | 10/1998 |

OTHER PUBLICATIONS

Int. Publication No. WO 85/01686, George Hartmann et al., Fixing Device for Supply Lines in Manipulators, Apr. 25, 1985.
WO 00/37224 Forslund et al. (Jun. 29, 2000).*
WO 00/25992 Salomonsson et al. (May 11, 2000).*

* cited by examiner

*Primary Examiner*—M. Alexandra Elve
*Assistant Examiner*—Kiley Stoner
(74) *Attorney, Agent, or Firm*—Dykema Gossett PLLC

(57) ABSTRACT

An industrial robot including a hollow arm pan (1) rotatable around its longitudinal axis (A) through which a cable set (4) is drawn through and connected to a robot unit (3) rotatable around an axis (A). The arm part and the robot unit are arranged for both rotation and bending relative to one another. The cable set (4) is guided and supported by a supporting means (5) rotatably arranged within arm part (1) so that the bending movement is accommodated by the part of the cable that is located between the supporting means (5) and the robot unit (3) and the rotational movement is accommodated by the part of the cable set that is located within the arm part (1) before the supporting means (5) when viewed from the power source (D).

11 Claims, 3 Drawing Sheets

ROBOT DEVICE

TECHNICAL FIELD

The present invention relates to an industrial robot with a device for guiding a cable set and to a method for and a use of the robot.

PRIOR ART

With industrial robots, it is usual to arrange the cable set within the robot. With welding robots, it is just as usual that the cable set is run on the outside of the robot. During welding work within the car industry, the robot must be able to reach inside confined spaces to weld. If the cable set then runs freely outside the robot, there is a risk that it will get caught in other items found in the assembly of cars, especially when the cable set is unprotected around the wrist and tool of the robot. Getting caught in this way leads in turn to damage to the robot and involuntary interruption of operations that has a detrimental effect on the production.

The term cable set here refers to process cable sets for, for example, welding electrodes, power supply for the actual tool and power supply for the robot. In addition, the term can include extra lines for, for example, different needs of the customer.

Document WO 85/01686 shows an industrial robot equipped with welding equipment. The cable set is run along the outside of the robot to a welding tool. Here the tool has the possibility to both rotate and pivot/bend more than 90° without this causing any greater stress in the cable set.

Document EP 0 873 826 shows a wrist for an industrial robot. The wrist is constructed from three parts (16,17,20) that are joined with one another to rotate and designed so that they form an open through channel. Cables and lines for the power supply are led through the wrist and out to a tool. The objective of the wrist is to fully enclose the cable set. The advantages that are specified are that the dimensions of the arm are reduced, that there is less risk that the cable gets caught and that there is less of a problem with deformation and torsion of the cables and lines. Inside the wrist, cable set 49 is firmly attached with two clamping means 50 and 51 that are arranged within the hollow elements 40 and 47 respectively. The design allows a maximum bending of the wrist of 90° through rotation of the parts 16 and 17 and simultaneous rotation of the cable set. The different cables, lines and tubing of the cable set lie spread out radially and are kept apart from one another over the whole cross-sectional area of the clamp.

Problems arise when the work that the robot is to perform requires that the robot can bend its wrist more than 90° and that it at the same time must protect the cable set. Cables for electrical power for welding electrodes, power supplies for tools and the robot, electrical signal cables for transferring information from sensors at the welding head, lines for pressurised air and coolants, etc., must be able to accommodate the required bending during simultaneous rotation despite them offering a large resistance to simultaneous bending and rotation. The supply lines in the European patent document are arranged spread out radially in clamps 50 and 51 and the design does not allow bending of the cable set by more than 90°.

When manufacturing industrial robots with a large freedom of movement of the tool, the need thus arises to arrange the cable set so that it is protected within the robot in a way that allows bending of the cable set by at least 90° during simultaneous rotation.

This need cannot be fulfilled by any of the industrial robots shown in the cited patent documents.

SUMMARY OF THE INVENTION

When designing robots, the object according to the invention is to design the robot so that its cable set runs protected the whole way through a central cavity through/in the robot. When the robot is used as, for example, a welding robot, it is required that the robot is equipped with a special cable set at the same time as good manoeuvrability of the welding tool is also needed. Within the. car industry in particular, a lot of welding work is done with robots. The welding tool must be able to rotate and turn for the robot to reach inside confined spaces in a manner suitable for welding techniques. The requirement for good manoeuvrability of the welding tool in turn requires that the cable set must be able to accommodate bending by 90° and more and rotate at the same time.

During simultaneous bending and rotation of a cable set, the individual lines are subjected to elastic strain and torsion. Since the robot moves in repeating cycles, this occurs all the time at the same places in the cable set, which over time leads to wear. The individual lines and cables are made of different materials dependent on their function. Their working life thus depends partly on the properties of the materials. The individual lines and cables behave differently due to their geometric location in the cable set. In locations where the deformation and torsion of the cable set is large, unwanted wear of the individual lines occurs. The working life of the lines thus also depends on their physical location in the cable set.

It is therefore necessary to replace a worn or alternatively damaged cable set after a certain period of operation to eliminate the risk of unwanted production stoppage.

The development of cable sets for robots is moving towards a more flexible system where the robot is equipped according to a standard concept. The customer then decides how the robot is to be equipped prior to delivery. In a flexible system, it is also possible for the customer to change the field of use for the robot.

In the light of the needs named above, a robot ought to be designed so that it is easy to replace or alternatively add to the cable set.

The object of the present invention is thus to achieve a robot in which a cable set is arranged in a compact/space-saving and protected manner. A further object of the invention is to arrange the supply lines so that they allow their bending by more than 90° and rotate a sufficient number of times without problem.

The solution according to the invention is to let a part of the cable set accommodate the rotational movement and another part of the cable set accommodate the bending movement and to arrange a guiding supporting means to allow a transition between rotational and bending movements.

DESCRIPTION OF THE DRAWINGS

The invention will be explained in greater detail by describing an example of an embodiment with reference to the enclosed drawings, where.

DESCRIPTION OF EMBODIMENTS

Figure 1A:
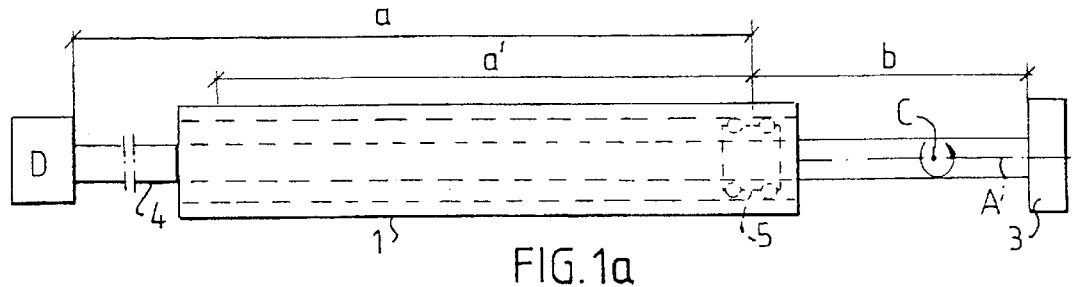
FIG. 1 shows a rotatable robot upper arm with a casing arranged according to the invention.

The invention relates to an industrial robot that includes a hollow arm part 1 rotatable around its longitudinal axis (A) through which a cable set 4 is drawn and connected to a robot unit 3 rotatable around an axis (B) where the arm part and the robot unit are arranged for combined rotation and bending relative to one another (FIG. 1a). The cable set is radially fixed in a guiding supporting means 5 arranged within arm part 1 where the said supporting means is arranged to rotate essentially in step with the rotatable robot unit 3. The cable set is guided and supported by supporting means 5 that is movably arranged within the arm. The supporting means can thus rotate and is arranged to slide within the arm within a limited interval of the longitudinal axis of the arm. During combined bending/tilting around an axis (C) and rotation around an axis (B) of the robot unit in relation to the arm part, the bending movement of the cable set is accommodated by the part of the cable set that is situated between the supporting means 5 and the robot unit 3 and the rotational movement is accommodated by the part of the cable set that is situated before the supporting means when seen from the direction of the power source.

The industrial robot (FIG. 1c) shown in the embodiment that includes the hollow upper arm 1 that is rotatable around its longitudinal axis (A) has a wrist 2 and a rotating disc 3'. A cable set (not shown) is drawn through the robot to the upper arm 1 and then through the wrist 2 and on to and through the rotating disc 3'. A tool, e.g. a welding unit (not shown), is arranged on and connected to rotating disc 3'.

Figure 1B:
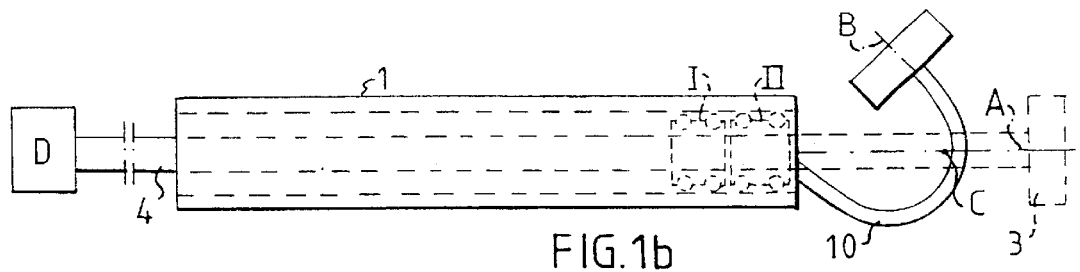
Figure 1C:
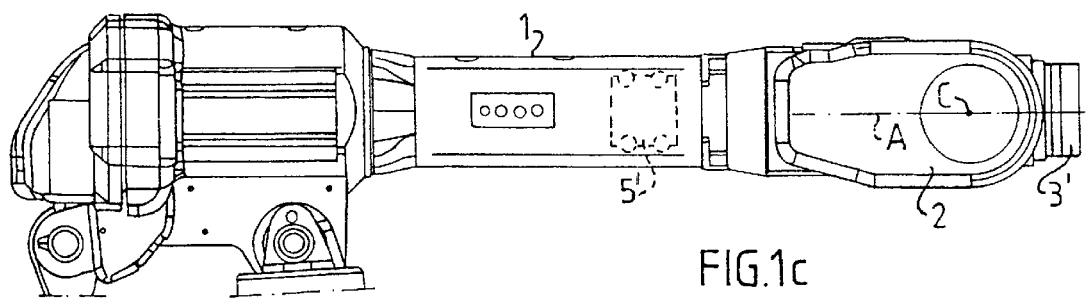

A guiding supporting means 5' is arranged within the upper arm 1 to guide the cable within the arm so that it is prevented from rubbing against the inside of the arm. In the described embodiment, the guiding supporting means 5 is shaped as a guiding block 5'. The block 5' is cylindrical and has through channels 6 through which the cable set 4 is drawn. Block 5' is rotatably arranged and arranged to slide within the arm along the axis (A). The block 5' is arranged in the upper arm 1 before a tilting axis (C) when seen from the power source (D), which corresponds to the tilting in the wrist (FIG. 1b).

Figure 2:
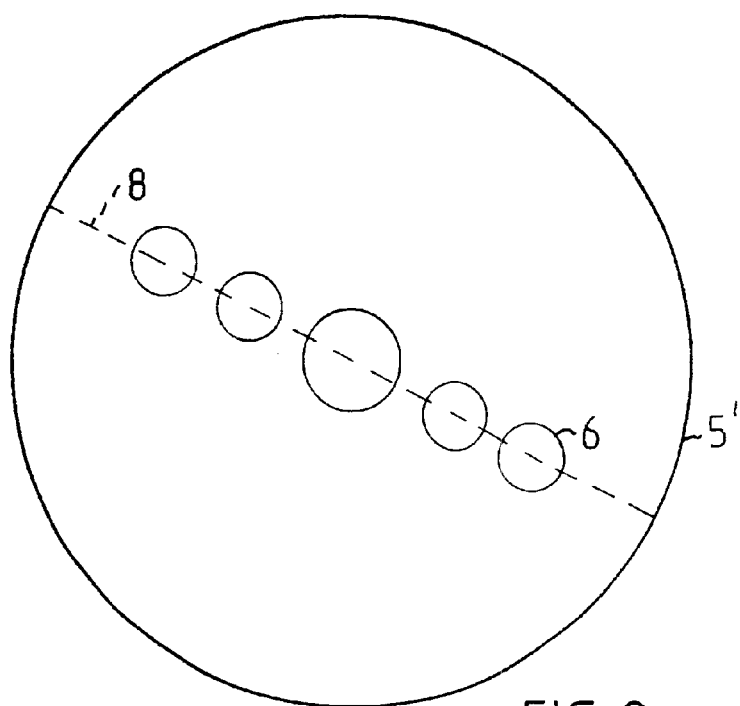
FIG. 2 shows a design of the invention with the lines spread out along a pitch diameter of the casing.

The individual lines that are included in the cable set 4 are axially displaceable and radially fixed in channels 6 in the block 5'. In this embodiment, the channels 6 are mutually oriented on a pitch diameter 8 of the block 5' (FIG. 2). The cable set 4 thus acquires the shape of a ribbon 10 (FIG. 1b).

The rotating disc 3' has a centrally located cavity through which the cable set passes. The cable set is attached to rotating disc 3' and the cables and lines included in the cable set are distributed along primarily the same pitch diameter 8 as in guiding block 5'. The rotating disc rotates around its centre axis (B) that without bending coincides with axis A.

The solution according to the invention (FIG. 1a) is to let a part of the cable set (a) accommodate the rotational movement and another part of the cable set (b) accommodate the bending movement. In the embodiment described here, it is in the part of the cable set that runs from the power source (D) through the upper arm and on to the guiding supporting means 5 that the rotation takes place. More specifically, it is in the part (a') immediately prior to the supporting means seen from the power source that the rotational movement is accommodated. Here the cable set is arranged as a bunch of cables and lines that allow their rotation. The bending movement takes place in the part (b) of the cable set that runs between the supporting means and the rotating disc/tool. Here, the cable set 4 is shaped as a ribbon of cables arranged side by side and the ribbon allows its bending. When the cable set alternately is bent and "straightened out", longitudinal variations occur that are accommodated by the cable set and individual lines being allowed to slide axially through the block. The block moves along a limited section of the longitudinal axis (A) of the arm between two stop positions in the form of, e.g., pins.

One alternative is that the block is rotatably arranged but is fixed in relation to the longitudinal axis (A) of the arm. The cable set is displaced axially through the block and the block rotates according to need. A further alternative is that both cable set and block move axially (FIG. 1b). In this alternative, at least one line in the cable set is rotatably attached in the block. It is preferably, the centre line that is firmly attached to the block. The centre line 6' (FIG. 2) is subjected to least strain and should therefore be the line in the cable set that is the most rigid. The length of the firmly attached line between the block and the rotating disc is adapted to give the cable set an appropriate radius of curvature. In FIG. 1b, I indicates the position of the block when the cable set is straight and II indicates the position of the block after bending of the cable set. If needed, the movement of the block in the longitudinal direction of the arm can be limited even here.

When the robot is working, the tool is controlled by a power source (not shown). The rotating disc/tool is rotated and the part (b) of the cable set functions as a carrier of rotational movement to the guiding supporting means, i.e. cable set part (b) drives the supporting means with a negligible time delay. The result is that the rotating disc and the supporting means rotate essentially synchronously.

Figure 3:
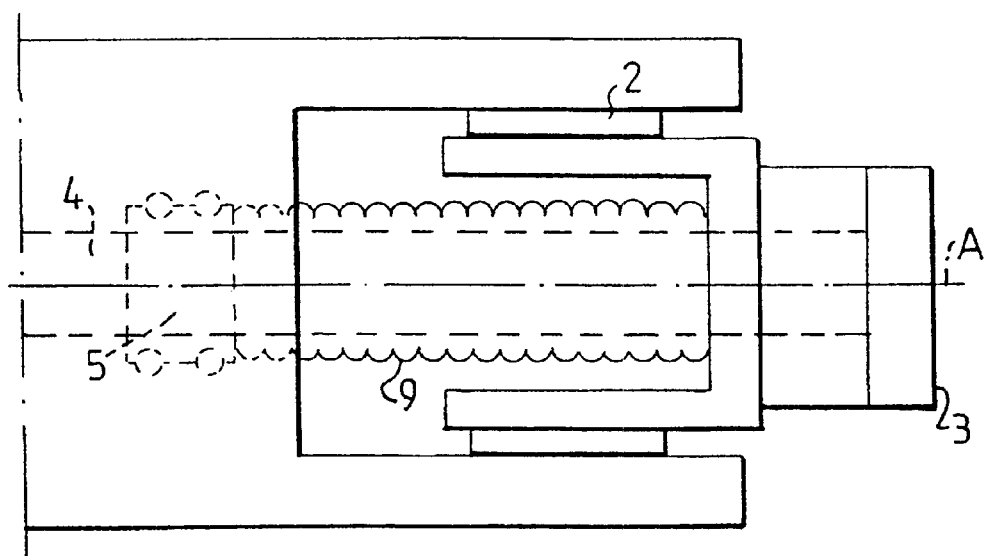
FIG. 3 shows the guiding means and robot unit with the cable set in a straight/non-bent position.
Figure 4:
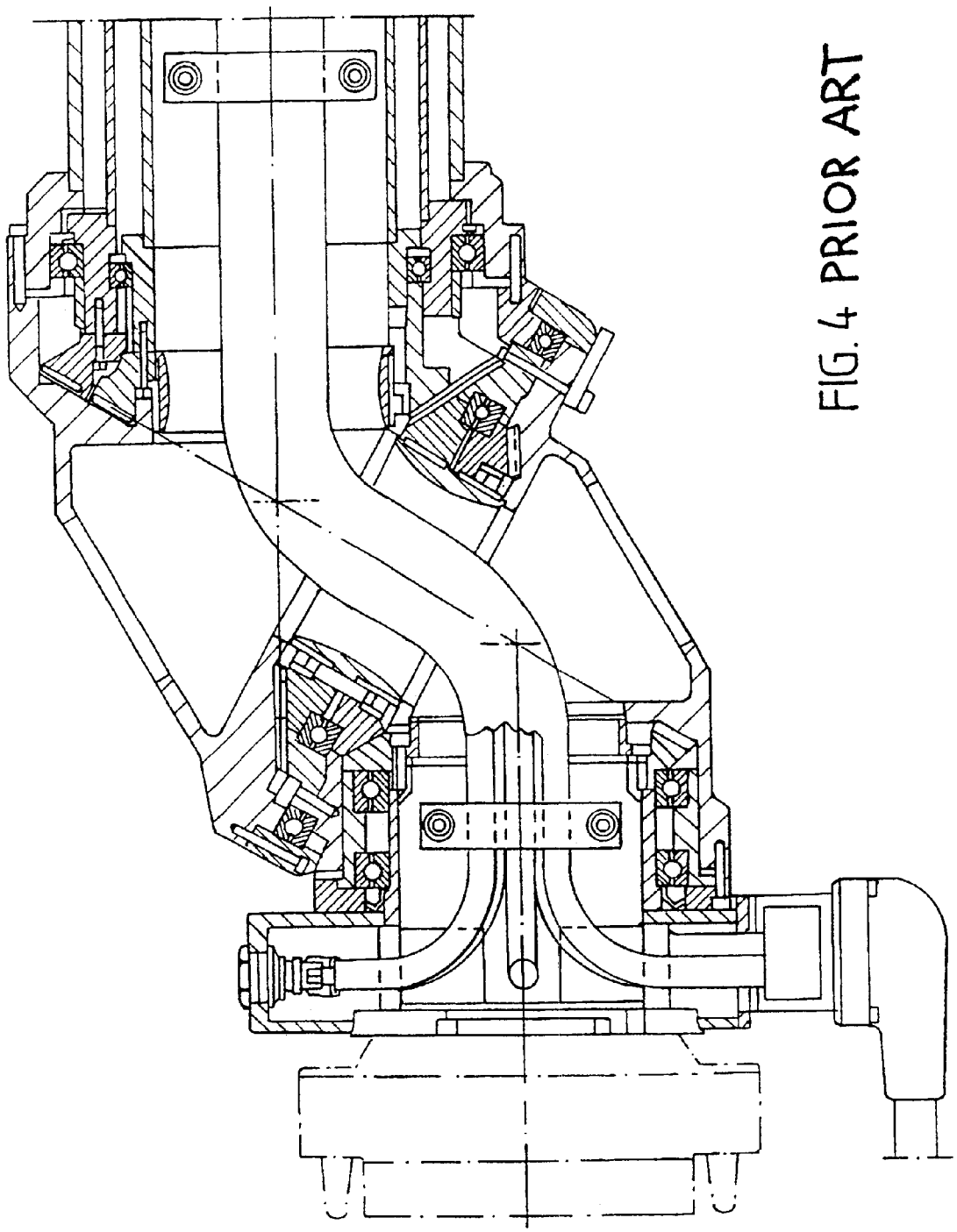
FIG. 4 shows the prior art.

To meet the demand that the cable set runs fully protected all the way through the robot and out through the rotating disc, cable set part (b) can be arranged running through a protecting casing 9 in the wrist (FIG. 3).

In an alternative embodiment of the invention, the guiding supporting means is designed as an axially moveable spherical supporting means. Then, the supporting means is arranged to guide with the possibility of a certain angular adjustment and axial movement.

In the light of the embodiment, one can consider a number of alternative ways to transfer the rotation from the rotating disc to the supporting means so that they rotate essentially in synchrony. A number of alternatives are given below:

flexible driving bellows gear wheels universal joints, of which all are, per se, known previously.

A further alternative is to locate a driving means on the rear part of the upper arm if the tool is considered to sit on the forward part of the upper arm. It is also possible to let the driving means drive both the rotating disc and the supporting means synchronously.

The cable set connects to the rotating disc respectively the supporting means with a mutual orientation that is maintained. The concept of the invention includes that the cable set can be arranged as a ribbon of lines and cables arranged side by side or with some other orientation that facilitates the bending movement.

To facilitate exchange, the cable set can be delivered with the rotating disc and the ached supporting means ready fitted.

What is claimed is:

1. An industrial robot including a hollow arm part rotatable around its longitudinal axis, a robot unit rotatable around its center axis and a cable set extending through the arm part and being connected to the robot unit, the arm part and the robot unit being arranged for both rotation and bending relative to one another, and the cable set being radially fixed in a guiding supporting means arranged within the arm part where the supporting means is arranged to rotate substantially in step with the rotating robot unit.

2. The industrial robot according to claim 1, wherein the cable set is arranged as a ribbon.

3. The industrial robot according to claim 1, wherein the supporting means is arranged to slide along the longitudinal axis.

4. The industrial robot according to claim 3, wherein the supporting means is arranged to slide along a limited length of the longitudinal axis.

5. The industrial robot according to claim 1, wherein the supporting means is firmly attached to the longitudinal axis.

6. The industrial robot according to claim 1, wherein the arm part comprises an upper arm.

7. The industrial robot according to claim 1, wherein the robot comprises a welding robot.

8. The industrial robot according to claim 1, wherein the robot unit comprises a rotating disc for a tool.

9. A method of manufacturing an industrial robot having a hollow arm part rotatable about its longitudinal axis, a cable set extending through the arm and being connected to a robot unit rotatable about an axis at which the arm part and the robot unit are arranged for both rotation and bending relative to one another, comprising the steps of providing a supporting means rotatably arranged within the arm part for guiding and supporting the cable set, accommodating the bending by that part of the cable set located between the supporting means and the robot unit, and accommodating the rotation by that part of the cable set that is located within the arm part before the supporting means when viewed from a power source provided for the robot.

10. The method according to claim 9, wherein the supporting means is caused to slide along the axis of rotation within the arm part.

11. The method according to claim 9, wherein the robot unit and the supporting means are caused to rotate essentially in synchrony.

* * * * *